(12) United States Patent
Hayashi et al.

(10) Patent No.: US 7,659,714 B2
(45) Date of Patent: Feb. 9, 2010

(54) ABNORMALITY DETECTION APPARATUS FOR ROTARY TYPE ABSOLUTE ENCODER

(75) Inventors: Yasukazu Hayashi, Aichi (JP); Shinji Shibata, Aichi (JP)

(73) Assignee: Okuma Corporation, Niwa-Gun, Aichi (JP)

( * ) Notice: Subject to any disclaimer, the term of this patent is extended or adjusted under 35 U.S.C. 154(b) by 114 days.

(21) Appl. No.: 12/047,931

(22) Filed: Mar. 13, 2008

(65) Prior Publication Data
US 2008/0224693 A1  Sep. 18, 2008

(30) Foreign Application Priority Data
Mar. 16, 2007  (JP)  ............... 2007-068619

(51) Int. Cl.
*G01B 7/30* (2006.01)
(52) U.S. Cl. ................................. 324/207.25
(58) Field of Classification Search ............. 324/207.25
See application file for complete search history.

(56) References Cited
U.S. PATENT DOCUMENTS
6,906,491 B2 * 6/2005 Matsuo et al. ............. 318/722

FOREIGN PATENT DOCUMENTS
JP  2005-61907  3/2005

OTHER PUBLICATIONS esp@cenet patent abstract for Japanese Publication No. 2005061907, Publication date Mar. 10, 2005 (1 page).

* cited by examiner

*Primary Examiner*—Reena Aurora
(74) *Attorney, Agent, or Firm*—Osha • Liang LLP

(57) ABSTRACT

In order to cope with many rotor diameters using a single type of stator portion, two stator portions, each having a built-in signal processing circuit for detecting absolute positions independently, are disposed in opposition at positions which differ from each other with respect to a rotational center of a rotor portion. When one of the stator portions receives a request command RX from an external device, it transmits a detected serial communication signal. The other stator portion receives the transmitted serial communication signal, determines a position detection abnormality, and notifies the abnormality to the external device when a difference between the received absolute position and the absolute position detected by the other stator portion exceeds a deviation previously set for 180 degrees.

5 Claims, 5 Drawing Sheets

| ADDRESS (CODE) | DATA (ROTATIONAL POSITION) | ANGLE |
|---|---|---|
| 00001 | $0000 | 0 |
| 00010 | $0888 | 12 |
| 00101 | $1111 | 24 |
| 01010 | $1999 | 36 |
| 10101 | $2222 | 48 |
| 01011 | $2AAA | 60 |
| 10111 | $3333 | 72 |
| 01110 | $3BBB | 84 |
| 11101 | $4444 | 96 |
| 11011 | $4CCC | 108 |
| 10110 | $5555 | 120 |
| 01100 | $5DDD | 132 |
| 11000 | $6666 | 144 |
| 10001 | $6EEE | 156 |
| 00011 | $7777 | 168 |
| 00111 | $8000 | 180 |
| 011111 | $8888 | 192 |
| 11110 | $9111 | 204 |
| 11100 | $9999 | 216 |
| 11001 | $A222 | 228 |
| 10011 | $AAAA | 240 |
| 00110 | $B333 | 252 |
| 01101 | $BBBB | 264 |
| 11010 | $C444 | 276 |
| 10100 | $CCCC | 288 |
| 01001 | $D555 | 300 |
| 10010 | $DDDD | 312 |
| 00100 | $E666 | 324 |

Fig. 6

ABNORMALITY DETECTION APPARATUS FOR ROTARY TYPE ABSOLUTE ENCODER

CROSS-REFERENCE TO RELATED APPLICATIONS

This application claims priority to Japanese Patent Application No. 2007-68619, filed on Mar. 16, 2007, which is incorporated herein by reference in its entirety.

BACKGROUND OF THE INVENTION

1. Field of the Invention

The present invention relates to an abnormality detection apparatus for a rotary type absolute encoder which includes a rotor portion and a stator portion disposed independently of each other, and in which information indicating an absolute position recorded in the rotor portion is read by an absolute sensor disposed in the stator portion.

2. Description of the Related Art

Heretofore, drive systems in which reduction gears including a worm gear or the like are combined with a servomotor have been used in the rotary shaft of circular tables or the like of machine tools. A drive system employing reduction gears, however, suffers from a problem of decreasing precision attributed to backlash and the limitation of the enhancement of a rotational speed. Recently, therefore, direct motor drive systems in which a built-in motor is incorporated and which more easily provides a higher precision and higher speed have come into use for the rotary shaft.

In general, a rotary type absolute encoder is used in the rotary shaft of the direct motor drive system for the purposes of performing magnetic pole position detection, speed detection and position detection which are necessary for the control of the built-in motor.

One type of rotary type absolute encoder is that disclosed in, for example, Japanese Patent Publication JP-A-2005-61907 (Patent Document 1). In this rotary type absolute encoder, a rotor portion bears an absolute code in which any continuous N bits at any desired rotational position are all different, and a stator portion reads the code of the N bits in the rotor portion, so as to detect an absolute position.

With the abnormality detection apparatus of this rotary type absolute encoder, if even one bit of the code of the N bits should be misread, it is possible that an erroneous absolute position might be determined without successfully detecting any error (abnormality). Even in such a case, however, because the rotor portion is rotated, whereby the error of the absolute position can be immediately detected. Meanwhile, when the abnormality of the absolute position is made detectable in a static state in order to heighten the reliability of the absolute position, it has been necessary that the stator portion be capable of reading an absolute code of about 2N bits as redundant bits for error detection. When an absolute code as large as 2N bits must be read, a sensor for reading the absolute code must be arranged on the surface of the stator portion in conformity with the curvature of the rotor portion. Further, stator portions must be individually prepared for the respective sizes of rotor portions. Because of these requirements, a problem of difficulty of handling a wide range of rotor diameters with one type of stator portion has remained, as stated in Patent Document 1.

Additionally, a method wherein two absolute encoders are mechanically disposed has been employed as a method for enhancing the reliability of the absolute encoder. This method, however, is problematic in that the required encoder installation space is basically doubled, while associated costs are double, or even more.

SUMMARY OF THE INVENTION

In accordance with an abnormality detection apparatus for a rotary type absolute encoder according to the present invention, in a case where an absolute code has been misread leading to an error in determining an absolute position, the abnormality of the absolute position can be detected without fail by comparing two absolute positions detected by two stator portions. It is accordingly possible to utilize the stator portion which can read only the minimum required absolute code. Additionally, the reality of absolute position detection can be enhanced while realizing an absolute encoder capable of coping with rotors of many diameters using a single design of stator portion.

Further, in a case where the two stator portions are disposed in opposition at positions which differ 180 degrees with respect to the rotational center of the rotor portion, reduced precision resulting from the eccentricity of the rotor portion can be advantageously compensate for by finding the average position of the two detected absolute positions. Therefore, the merits of attaining a higher precision can be combined with the enhancement of the reliability of the absolute position by disposing the two stator portions.

Moreover, compared to an apparatus wherein two sets of absolute encoders are disposed in order to enhance reliability, the absolute encoder of the present invention can use a common rotor portion and therefore can be configured in a smaller installation space and at a lower cost.

BRIEF DESCRIPTION OF THE DRAWINGS

FIG. 6 is a table for explaining the contents of a ROM 32 in FIG. 3 or FIG. 5.

DESCRIPTION OF THE PREFERRED EMBODIMENTS

Now, embodiments of the present invention will be described in conjunction with the drawings.

Embodiment 1

Figure 1:
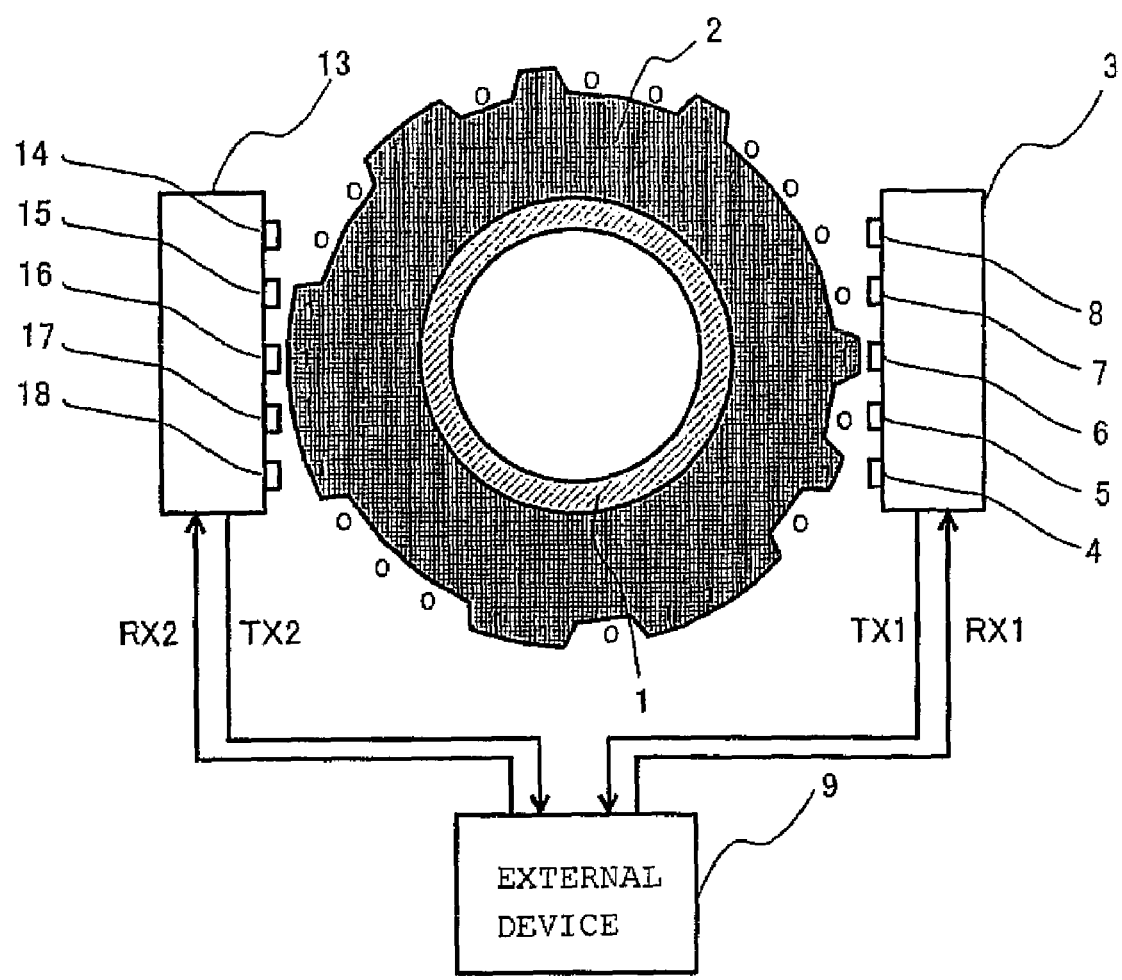
FIG. 1 is a view showing an embodiment of an abnormality detection apparatus for an absolute encoder according to the present invention.

FIG. 1 is a view showing Embodiment 1 of an abnormality detection apparatus for a rotary type absolute encoder according to the present invention. Stator portions 3 and 13 are arranged in opposition with a rotor 2 interposed therebetween. Each of the stator portions 3 and 13 is in the shape of a rectangular parallelepiped, and generally located adjacent to the outer peripheral surface of the disc-shaped rotor 2. Accordingly, a horizontal line passing through the center of the rotor 2 in the stator portions 3 and 13 is nearest to the rotor 2, and the stator portions 3 and 13 become more distant from the rotor 2 above and below the position of the horizontal line. Five magnetic sensors 4, 5, 6, 7 and 8, and 14, 15, 16, 17 and 18 which are arranged at substantially equal intervals with predetermined gaps are respectively disposed on those surfaces of the stator portions 3 and 13 which oppose the outer peripheral part of the rotor 2. Additionally, although not shown, permanent magnets which generate magnetic fluxes toward the center of the rotor 2 are built into the stator portions 3 and 13.

By way of example, the disc-shaped rotor 2 which is made of a magnetic material and which is centrally provided with a hole is joined to a hollow shaft 1 which may be connected to the rotary shaft of a motor. A cyclic code which indicates an absolute position with 5 bits and whose circulation cycle is 30, as indicated in a table in FIG. 6, is recorded in the rotor 2 by etching the outer peripheral part of this rotor.

It may also be noted that an interval corresponding to one bit of the cyclic code recorded in the rotor 2 is substantially the same interval as each of the arrangement intervals of the magnetic sensors 4, 5, 6, 7 and 8 and the magnetic sensors 14, 15, 16, 17 and 18 which are respectively arranged on the stator portions 3 and 13.

Next, the signal processing circuit of each of the stator portions 3 and 13 will be described.

Figure 3:
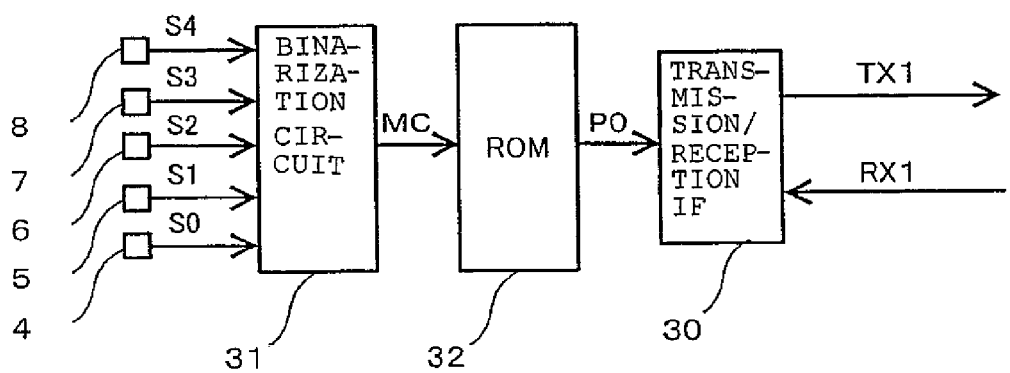
FIG. 3 is a block diagram showing an example of a signal processing circuit which is built in each of the stator portions 3 and 13 in FIG. 1.

FIG. 3 is a block diagram showing the signal processing circuit which is built in the stator portion 3. Signals S0, S1, S2, S3 and S4 which have been respectively sensed by the five magnetic sensors 4, 5, 6, 7 and 8 and which indicate the concave/convex states of the outer periphery of the rotor 2 are converted by a binarization circuit 31 into data MC which indicates the 5 bits of the cyclic code at the outer peripheral part of the rotor 2 as have been read by the magnetic sensors, and the data MC is inputted to a ROM 32 as an address signal.

In the ROM 32, the data of a corresponding address is pre-stored so that the data corresponds to a rotational position of the rotor 2, in such a way that the cyclic code (5 bits) recorded in the rotor 2 and having the circulation cycle of 30 is associated with the address as indicated in the table in FIG. 6. Here, hexadecimal data $0000 corresponds to a rotational angle of 0 degree, and data $8000 corresponds with a rotational angle of 180 degrees.

Thus, the ROM 32 converts the address into data indicating the absolute position data PO of the rotor 2, on the basis of the data MC. When a transmission/reception IF 30 receives a request command RX1 from the motor controller or the like of an external device 9 in FIG. 1, it converts the absolute position data PO of the rotor 2 into a serial communication signal TX1, and then transmits the signal TX1 to the external device 9 such as a motor control device.

On the other hand, the same signal processing circuit as shown in FIG. 3 may alternatively be provided in the stator portion 13. In the signal processing circuit included in the stator portion 13, merely the sensors 4, 5, 6, 7 and 8 are respectively replaced with the sensors 14, 15, 16, 17 and 18, and the serial communication signals RX1 and TX1 with serial communication signals RX2 and TX2. The functions of both the signal processing circuits are identical.

Figure 4:
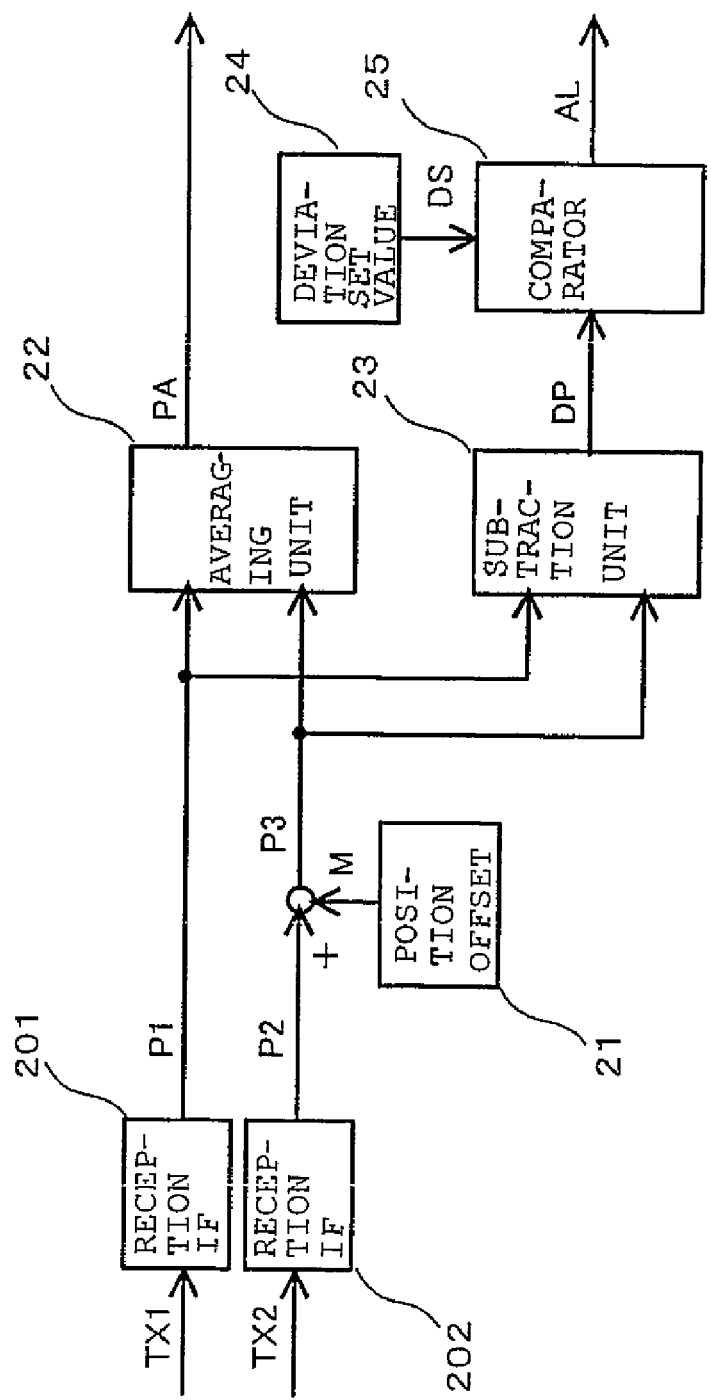
FIG. 4 is a block diagram showing an example of a signal processing circuit which is built in an external device 9 in FIG. 1.

FIG. 4 is a block diagram showing the position detection processing of the external device 9 in FIG. 1. All variables in the block diagram are noted using 16 bit hexadecimal notation, and they are expressed by a unit system in which the hexadecimal data $8000 corresponds to a rotational angle of 180 degrees. A reception IF 201 converts the serial communication signal TX1 of the stator portion 3 into position data P1. Likewise, a reception IF 202 converts the serial communication signal TX2 of the stator portion 13 into position data P2. During the manufacturing process, the mounting angle M of the stator portions 3 and 13 (in this embodiment, the data $8000 because of 180 degrees) is pre-stored as a position offset 21 in a nonvolatile memory or the like. The position data P2 and the mounting angle M of the stator portions 3 and 13 are combined as a position data P3 after position offset correction.

An averaging unit 22 executes the following processing to determine the average position PA of the two detected absolute positions, and thereby compensate for the effect on precision of the eccentricity of the rotor portion 2:

$$PA = P1 + (P3 - P1)/2 \quad \text{(Formula 1)}$$

A subtraction unit 23 executes the following processing to determine the difference DP between the two detected absolute positions:

$$DP = P3 - P1 \quad \text{(Formula 2)}$$

However, when DP>$8000, DP=$10000−DP holds.

During manufacture, the threshold value DS of a position detection abnormality is pre-stored as a deviation set value 24 in a nonvolatile memory or the like. A comparator 25 outputs a position detection abnormality signal AL in a case where the difference DP between the two detected absolute positions is greater than the threshold value DS of the position detection abnormality. The motor control device or the like establishes an emergency stop state in response to the position detection abnormality signal AL, in response to which the motor control is stopped.

Embodiment 2

Figure 2:
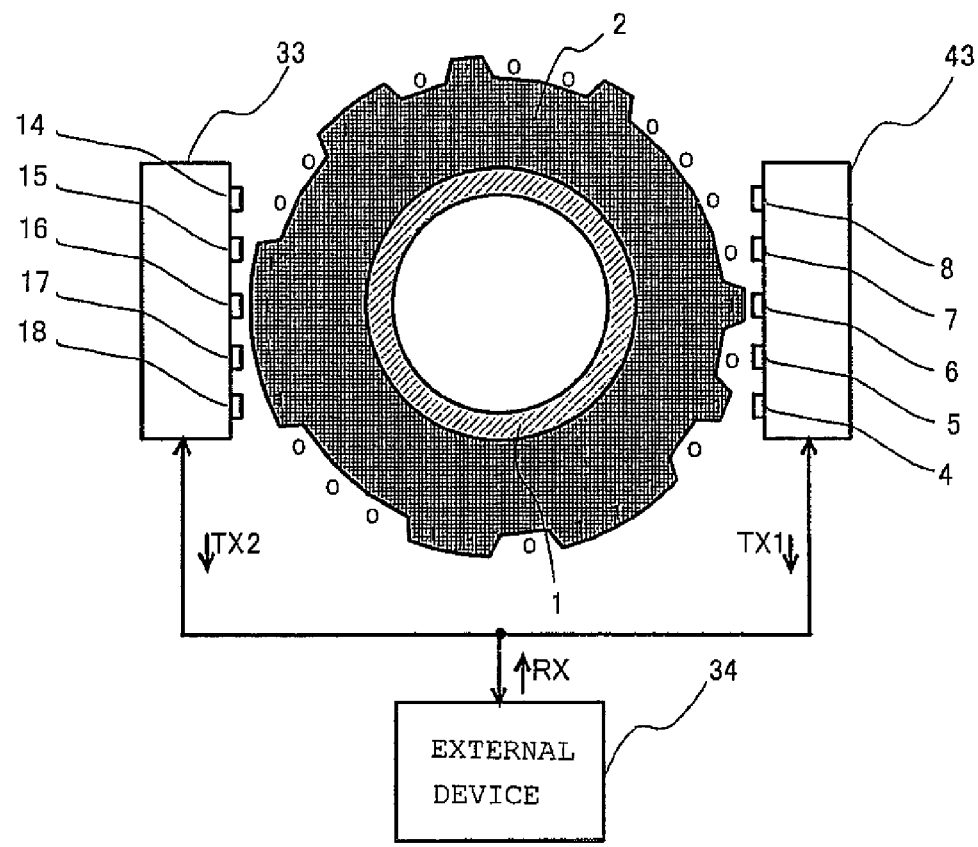
FIG. 2 is a view showing another embodiment of an abnormality detection apparatus for an absolute encoder according to the invention.
Figure 5:
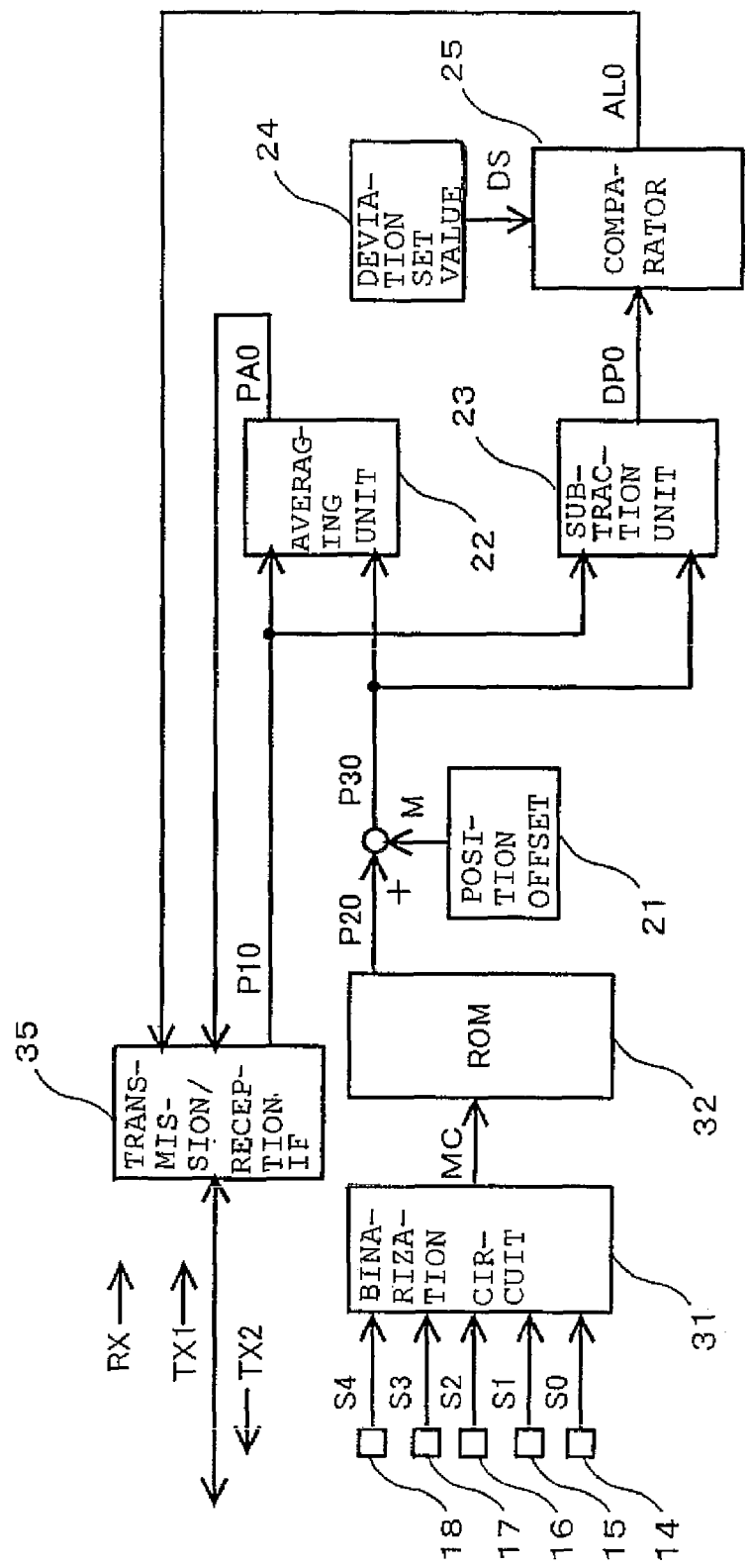
FIG. 5 is a block diagram showing an example of a signal processing circuit which is built in a stator portion 33 in FIG. 2.

FIG. 2 is a view showing Embodiment 2 of an abnormality detection apparatus for a rotary type absolute encoder according to the invention. FIG. 5 is a block diagram showing the signal processing circuit of a stator portion 33. Components corresponding to hose of Embodiment 1 shown in FIG. 1, etc. are assigned identical reference numerals, and their description is not repeated.

In this embodiment, the stator portion 33 and a stator portion 43 are included instead of the stator portions 3 and 13 in FIG. 1. The stator portion 43 has a built-in signal processing circuit for detecting an absolute position independently, and the signal processing circuit is connected to an external device 34 and the stator portion 33 through a bus-coupled serial network. This signal processing circuit is almost the same as the signal processing circuit of the stator portion 3 in FIG. 1, with the only significant difference being that the bus coupling enables serial communication. When the stator portion 43 receives a request command RX from the external device 34, it converts absolute position data P0 into a serial communication signal TX1, and then transmits the signal TX1 to the external device 34 and the stator portion 33. When a transmission/reception IF 35 in the stator portion 33 as shown in FIG. 5 receives the request command RX from the external device 34 in FIG. 2, it receives the serial communication signal TX1 transmitted from the stator portion 43, and then converts the signal TX1 into an absolute position P10. An averaging unit 22 determines the average position PA0 of two absolute positions P10 and P30, and outputs the absolute position PA0 from which the effect of the decreased precision attributed to the eccentricity of a rotor portion 2 has been canceled. Additionally, a subtraction unit 23 and a comparator 25 output a position detection abnormality signal AL0 when the difference DP0 between the two absolute positions P10 and P30 has reaches or exceeds a preset deviation DS. In addition, the transmission/reception IF 35 converts the average position PA0 and the position detection abnormality signal AL0 into a serial signal TX2, and then outputs this signal TX2 to the external device 34.

It should be noted that when the two stator portions are restricted so as to be always disposed in opposition at positions differing 180 degrees, the mounting angle M need not be preset. Further, the abnormality detection apparatus has the function of checking an installation state indicating whether the two stator portions are normally disposed at positions differing by 180 degrees which advantageously increase precision.

In this manner, in accordance with this embodiment, an abnormality in the position detection of the absolute encoder which calculates an absolute angle by utilizing an irregular cyclic code is detected, and the abnormality can be recognized by the position detection based on the two stator portions. Accordingly, the same stator portions are able to accommodate rotors of a wide variety of diameters.

What is claimed is:

1. An abnormality detection apparatus for a rotary type absolute encoder, comprising:
    a rotor portion in which information indicating an absolute position within one revolution is recorded;
    two stator portions on each of which an absolute sensor that reads the information indicating the absolute position and recorded in said rotor portion is mounted, and which are independently disposed at positions that differ by a predetermined angle of M degrees with respect to a rotational center of said rotor portion; and
    an abnormality detection portion which determines a position detection abnormality when a difference between the absolute position detected by one of said stator portions and the absolute position detected by the other stator portion exceeds a deviation previously set for the M degrees.

2. An abnormality detection apparatus for a rotary type absolute encoder as defined in claim 1, wherein an absolute code in which all bits of N bits (N being any desired plus integer of, at least, 2) continuous at any desired rotational position are different is recorded in said rotor portion, and said two stator portions detect the absolute positions by reading the absolute code of the N bits in said rotor portion.

3. An abnormality detection apparatus for a rotary type absolute encoder as defined in claim 1 wherein:
    said two stator portions are disposed in opposition at positions that differ 180 degrees with respect to the rotational center of said rotor portion, and
    each has a built-in signal processing circuit for independently detecting the absolute positions so as to transmit the detected absolute positions to an external device; and
    the external device determines a position detection abnormality when a difference between two received absolute position information items exceeds a deviation previously set for 180 degrees.

4. An abnormality detection apparatus for a rotary type absolute encoder as defined in claim 1, wherein:
    said two stator portions are disposed in opposition at positions that differ 180 degrees with respect to the rotational center of said rotor portion, and each has a built-in signal processing circuit for independently detecting the absolute position;
    said two stator portions are connected to an external device though a bus-coupled serial network, and one of said stator portions transmits the absolute position detected by itself, to the external device when it receives a request command from the external device; and
    the other stator portion receives the absolute position transmitted from said one stator portion, determines a position detection abnormality, and notifies the abnormality to the external device when a difference between the absolute position received and the absolute position detected by said other stator portion itself exceeds a deviation previously set for 180 degrees.

5. An abnormality detection apparatus for a rotary type absolute encoder as defined in claim 1, wherein each of said two stator portions includes a plurality of magnetic sensors, and said plurality of magnetic sensors in said each stator portion are arranged rectilinearly.

* * * * *